Patented Nov. 29, 1938

2,138,763

UNITED STATES PATENT OFFICE 2,138,763

AMINO ALCOHOL ESTERS OF THE ALPHA SUBSTITUTED ACRYLIC ACIDS

George D. Graves, Wilmington, Del., assignor to E. I. du Pont de Nemours & Company, Wilmington, Del., a corporation of Delaware No Drawing. Application March 30, 1938, Serial No. 198,857

17 Claims. (Cl. 260—83)

The present invention relates to new compositions of matter and to processes for their preparation. More specifically, it relates to certain amino alcohol esters of the α-substituted acrylic acids and to various methods for making them. The specific compositions to which the application is still more particularly directed are esters of α-alkacrylic acids, such as α-methacrylic acid, with amino alcohols in which the amino nitrogen is tertiary. This application is a continuation in part of my copending application Serial No. 21,807, filed May 16, 1935.

An object of the present invention is to provide new and useful compositions of matter, and processes for their preparation. A further object of the invention is to provide monomeric and polymeric esters of α-substituted acrylic acids with amino alcohols having tertiary amino nitrogen, together with processes for their preparation. A more specific object of the invention is to provide a process for the preparation of these esters from esters of the α-alkacrylic acids with simple lower aliphatic alcohols, such as methanol, which are more volatile than the amino alcohol. Another object of the invention is to provide new and useful polymers through the copolymerization of amino alcohol esters of α-alkacrylic acid and other polymerizable compounds, more particularly esters of α-methylene carboxylic acids.

The above and other objects appearing hereinafter are accomplished by reacting an α-substituted acrylic acid, or suitable derivative thereof (i. e., the anhydride, an acid halide, or lower aliphatic alcohol ester thereof) with an amino alcohol in which the amino nitrogen is tertiary, or with an alkali or alkaline earth metal alcoholate of such amino alcohol. The polymers and interpolymers are prepared by subjecting the monomeric ester or esters to polymerizing conditions in accordance with methods given hereinafter.

The monomeric esters of this invention are prepared most readily by reacting (1) an amino alcohol in which the amino nitrogen is tertiary with (2) an ester of an α-substituted acrylic acid and an alcohol more volatile than the amino alcohol. In the more detailed practice of this method, the reaction is conducted in the presence of a liquid diluent which, under the conditions of the process, is a solvent for, and chemically inert toward, reactants and product. Suitable diluents of this type are benzene, toluene, and dioxan. I also employ a polymerization inhibitor, such as hydroquinone, for the esters used and formed, as well as a suitable ester interchange catalyst, such as an alkali metal alcoholate. The reaction mixture is heated under a fractionating column until the theoretical quantity of liberated alcohol has distilled, after which the product is usually isolated by vacuum distillation.

An alternative method particularly well adapted for the preparation of many of the various amino alcohol esters, which method will hereinafter be more fully particularized, is to react an acid halide of the α-alkacrylic acid with an alkali metal amino alcoholate, in the presence of a solvent of the aforesaid type.

Several examples, in which parts are by weight, are now given to illustrate the invention, but it will be understood that the invention is not limited by the details therein given except as indicated by the appended claims.

*Example 1.—β-dimethylaminoethyl methacrylate*

A solution of 89 parts (1 mol) of β-dimethylaminoethanol and 400 parts (4 mols) of methyl α-methacrylate in 500 parts of dry benzene containing 30 parts of p-phenylenediamine is heated in an oil bath under a 48 inch fractionating column fitted with a distilling head arranged for controlled reflux. After all the moisture present in the reagents has been removed, as shown by a clear distillate, a solution of 2 parts of metallic sodium in 15 parts of dry methanol is added dropwise over a period of six hours, during which time a benzene-methanol binary (boiling point about 58° C.) is distilled off. The refluxing and collecting of binary are continued until no more methanol is liberated. The reaction mixture is then cooled and filtered, after which the excess methyl methacrylate and any remaining inert solvent are removed by distilling through a 24 inch column under reduced pressure. The residue is finally vacuum-distilled through a short column in an atmosphere of nitrogen. The product thus obtained is β-dimethylaminoethyl methacrylate of the formula

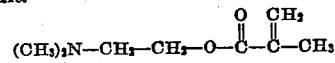

Yields are generally good and often as high as 95%. This ester is a colorless liquid of slightly pungent odor and boiling at 62–65° C. under 6 mm. pressure. The nitrogen content was found to check within experimental error with the calculated value.

The above monomeric ester, as well as others exemplified hereinafter, can be readily polymerized by exposure of solutions of the monomer to ultraviolet light. It is desirable first to purify carefully both monomer and solvent in order to avoid discoloration of the polymer. Polymerization may also be effected by heating with polymerization catalysts, such as benzoyl peroxide, though such polymerization is sometimes slow, due apparently to the mild inhibiting action of the amino group. Nevertheless, it is quite remarkable, in view of the known strong anti-polymerization action of amines, that a compound containing an amino group can be made to polymerize at all. The polymers are transparent, fairly soft resins that are as a rule insoluble in water and the common oxygen-containing organic solvents.

*Example 2.—β-diethylaminoethyl methacrylate*

One hundred seventeen (117) parts (1 mol) of β-diethylaminoethanol and 400 parts (4 mols) of methyl α-methacrylate are dissolved in 500 parts of dry benzene containing 30 parts of p-phenylenediamine and heated under the conditions given in Example 1. The resulting β-diethylaminoethyl methacrylate is isolated by collecting the fraction boiling at 80 to 90° C. at 5 mm. pressure, carefully washing several times with cold water to remove traces of p-phenylenediamine, drying with anhydrous magnesium sulfate, filtering, washing the drying agent with ether, combining the washings with the bulk of the product, and then distilling off the ether at 25° C. under reduced pressure in an atmosphere of nitrogen. The monomeric ester is left in the distilling vessel as an almost colorless liquid. It has the formula $$(C_2H_5)_2N-CH_2-CH_2-O-\overset{O}{\underset{\|}{C}}-\overset{CH_2}{\underset{\|}{C}}-CH_3$$

boils at 86–7° C./5 mm., and polymerizes, on being subjected to actinic light at 25° C. for several hours, to a tough, transparent, pale amber polymer insoluble in water, alcohol, acetone, and ethyl acetate.

In the above example benzidine or hydroquinone may be used in lieu of p-phenylenediamine, if desired, whereby the purification steps required with the latter are eliminated.

*Example 3.—β-dicyclohexylaminoethyl methacrylate*

β-Dicyclohexylaminoethanol is first prepared as follows. Eighty (80) parts (1 mol) of ethylene chlorhydrin are added with stirring over a period of 20 minutes to 185 parts (1.02 mols) of dicyclohexylamine maintained at 90° C. The resulting mixture is stirred and heated in an oil bath at a temperature of 130–140° C. (inside reaction vessel) for 14 hours, cooled, and treated with 20% sodium hydroxide solution. The oil which forms is separated, washed with water, dried, and fractionally distilled in vacuo. The β-dicyclohexylaminoethanol thus obtained boils at 156–163° C. at 6 mm. pressure and has a neutralization equivalent of 228.5 (calculated value 225).

One hundred (100) parts (1 mol) of methyl α-methacrylate, 56 parts (0.25 mol) of β-dicyclohexylaminoethanol as above obtained, 225 parts of dry benzene, and 10 parts of p-phenylenediamine are heated together as described under Example 1. β-Dicyclohexylaminoethyl methacrylate is formed, and is isolated and purified as described in Example 2. The yield is around 75%. The nitrogen content was found to be 4.87% as compared to a calculated value of 4.80%. The monomeric ester has the formula $$(C_6H_{11})_2N-CH_2-CH_2-O-\overset{O}{\underset{\|}{C}}-\overset{CH_2}{\underset{\|}{C}}-CH_3$$

boils at about 156–7° C./2 mm., and polymerizes on standing in actinic light for two days at 25° C. to a tough, elastic resin insoluble in water and many common oxygenated organic solvents such as alcohols and ketones. It is soluble, when first prepared, in butyl acetate and kerosene, and solutions in these solvents may be used as coating compositions.

*Example 4.—β-di-n-butylaminoethyl methacrylate*

A mixture of 230 parts (2.3 mols) of methyl α-methacrylate, 100 parts (0.58 mol) of β-di-n-butylaminoethanol, 450 parts of dry benzene, and 20 parts of p-phenylenediamine are heated together in the manner described in Example 1. β-Di-n-butylaminoethyl methacrylate is formed and is isolated as in Example 2. This ester boils at 108–9° C./2 mm. and has the formula $$(C_4H_9)_2N-CH_2-CH_2-O-\overset{O}{\underset{\|}{C}}-\overset{CH_2}{\underset{\|}{C}}-CH_3$$

It polymerizes easily to a tough, transparent, slightly yellow resin insoluble in water, acetone, and ethanol, and soluble in toluene and butyl acetate.

*Example 5.—4-(β-methacrylyloxyethyl) morpholine*

4-(β-hydroxyethyl) morpholine is first prepared as follows: 300 parts of triethanolamine hydrochloride are pyrolyzed in a distilling vessel at 7 mm. pressure for approximately six and one-half hours at a temperature gradually increasing from 204° C. to 280° C. During this time 261 parts of distillate is collected. This distillate is dissolved in 600 parts of ethanol, and to this solution is added 175 parts of 56% aqueous potassium hydroxide. The resulting mixture is refluxed for approximately three hours, cooled, and the precipitate filtered off. This precipitate is washed with ether, the ether extract combined with the filtrate, and the solvents removed from the filtrate by vacuum distillation through a fractionating column. The residual oil is taken up with an equal volume of ether and the solution shaken with potassium carbonate. The 4-(β-hydroxyethyl) morpholine which separates with the ether is removed, dried with anhydrous magnesium sulfate, filtered, and purified by distillation under reduced pressure, the fraction boiling at 89–96° C., at 6 mm. pressure being collected. This compound is 4-(β-hydroxyethyl) morpholine of the formula $$HO-CH_2-CH_2-N\begin{array}{c}CH_2-CH_2\\ \diagdown\\ \diagup\\ CH_2-CH_2\end{array}O$$

Eighty-three (83) parts (0.63 mol) of 4-(β-hydroxy-ethyl) morpholine as prepared above, 250 parts (2.5 mols) of methyl α-methacrylate, 300 parts of dry benzene, and 10 parts of p-phenylenediamine are heated together in a vessel to which is attached a 48 inch fractionating column fitted with a distilling head arranged for controlled reflux. After the moisture present in the reagents is removed, as shown by a clear distillate, a solution of 2 parts of metallic sodium in 15 parts of methanol is added dropwise over a period of three hours, during which time a benzene-methanol binary (B. P. 58° C.) distills off. After no more binary passes over, the mixture is allowed to stand overnight, filtered, the precipitate washed with ether, and the solvents and excess methyl methacrylate removed by distillation through a 30 inch column under reduced pressure. The residue is then distilled in vacuo through a short column, the fraction boiling at 96–100° C. at 1 mm. pressure being collected. To this fraction is added 20 parts of acetic anhydride, after which the mixture is allowed to stand three hours at room temperature, filtered, and the precipitate washed on the filter with a small volume of ether; the purpose of this treatment is to remove p-phenylenediamine. The washings and filtrate are combined, diluted with two volumes of water, the mixture thoroughly agitated for a few minutes, and the organic compound salted out with potassium carbonate. The oily material obtained is dissolved in an equal volume of ether, the solution dried over anhydrous magnesium sulfate and filtered, the drying agent washed with ether, the washings and filtrate combined, and the ether distilled off under reduced pressure at room temperature. The residue is monomeric 4-(β-methacrylyloxyethyl) morpholine, of the formula

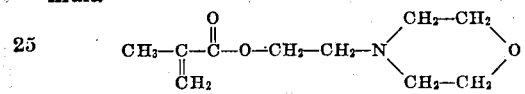

an almost colorless water-soluble oil, B. P. 98–99° C./1 mm. and $$N_D^{25} 1.4653$$

having a nitrogen content which checks the calculated value within experimental error. The monomeric ester upon standing in sunlight at 25° C. for 12 hours polymerizes to a tough, elastic resin insoluble in water. The monomer may be preserved unchanged by addition thereto of 1 to 2% of a polymerization inhibitor such as p-phenylenediamine or hydroquinone.

*Example 6.—Triethanolamine monomethacrylate*

To 7.5 parts (0.5 mol) of triethanolamine and 12.5 parts (0.5 mol) of sodium there is added 320 parts of dry dioxan, and the mixture refluxed until the sodium has reacted. The solution is then allowed to cool to 30° C., and 52 parts (0.5 mol) of methacrylyl chloride is added with stirring over a period of 40 minutes. Stirring is continued for one hour longer, the sodium chloride removed by filtration, 10 parts of hydroquinone added to the filtrate, and the dioxan removed by distillation under reduced pressure. The residual oil is dissolved in ether, the hydroquinone removed by washing with aqueous sodium hydroxide solution, the ether solution dried, and the ether removed by vacuum distillation at 20–25° C. The residue is triethanolamine monomethacrylate of the formula

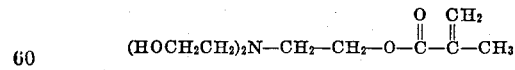

a water-soluble amber-colored oil basic to litmus and containing 6.26% nitrogen (calculated amount 6.45%). It polymerizes on standing, even at temperatures as low as 0° C., to a tough, transparent insoluble resin. The monomer may be preserved by addition thereto of 0.5% hydroquinone.

*Example 7.—2-(diethylamino) cyclohexyl methacrylate*

To a solution of 35 parts (0.2 mol) of 2-(diethylamino)cyclohexanol in 150 parts of dry dioxan is added 4.6 parts (0.2 mol) of sodium, and the mixture refluxed with stirring for 20 hours. It is then cooled; 20.8 parts (0.2 mol) of α-methacrylyl chloride is added with stirring over a period of 4 hours; and the resulting mixture is refluxed for about a half hour. The solution is then cooled, diluted with a large volume of water, an excess of sodium hydroxide solution added, and the oily layer that forms separated, dried and vacuum distilled. The fraction boiling at 91–99° C. at 1 mm. pressure is collected. This product, which is 2-(diethylamino)-cyclohexyl methacrylate of the formula

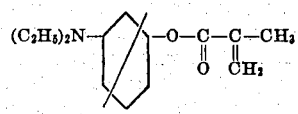

is a pale yellow oil of $$N_D^{25} 1.4649$$

boiling in the pure state at about 97–8° C./1 mm., and having a nitrogen content which checks within experimental error with the calculated value. This amino methacrylate, on standing at 20° C. for 24 hours in actinic light, or on heating at 150° C. for one hour, polymerizes to a tough, transparent, nearly colorless resin insoluble in water and soluble in benzene and butyl acetate. It is useful as an acid acceptor in coating compositions.

*Example 8.—1-(β-methacrylyloxyethyl) piperidine*

A solution of 2 parts of sodium in 15 parts of methanol is added during the course of two hours to a boiling solution, in 350 parts of dry benzene, of 101 parts (0.78 mol) of 1-(β-hydroxyethyl)piperidine, 314 parts (3.3 mols) of methyl α-methacrylate, and 20 parts of p-phenylenediamine. During the addition of the sodium methylate, the solution is heated at boiling temperature under an upright 48 inch fractionating column. During this time a benzene-methanol binary boiling at about 58° C. is taken off at the head of the column. Heating is continued until no more binary passes over. The reaction mixture is cooled, and the solvent and excess methyl methacrylate are removed by fractional distillation through a long column under reduced pressure. The desired product is finally obtained by distilling the residue in vacuo through a short column, collecting the fraction boiling at 75–80° C. at 1 mm. pressure, washing it several times with water, and drying it with anhydrous magnesium sulfate. The 1-(β-methacrylyloxyethyl) piperidine thus produced has the formula

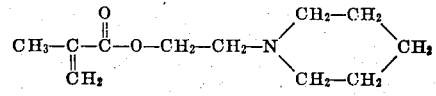

is an oily liquid of $$N_D^{25} 1.4662$$

boils in the pure state at 78–79° C./1 mm., has a nitrogen content of 7.27% (calculated value 7.53%), and polymerizes on standing at 25° C. for 18 hours to a tough, clear, orange-colored resin which becomes hard, horn-like and insoluble when heated at 100° C. for 4 hours or when allowed to stand at room temperature for 3 days.

As an alternative and highly useful procedure for polymerizing the esters of this invention, the monomeric ester may first be emulsified in a non-solvent with the aid of a suitable dispersing agent, the emulsion subjected to polymerizing conditions, and the polymer isolated by coagulation with salts or by evaporation of the dispersing medium. Suitable dispersing media are water and other inert liquids in which the monomer is insoluble. The dispersing agent may be a naphthalene sulfonic acid having alkyl ring substituents, or it may be an alkali metal salt, particularly the sodium or potassium salt, of the sulfates of the alcohols obtained by hydrogenation of fatty oils. Still other suitable dispersing agents are sodium and potassium oleates. Such polymerizations, which are illustrated in Example 9, are carried out satisfactorily by heating in the presence of polymerization catalysts, such as benzoyl peroxide, for 15 to 25 hours at 60 to 95° C. The resins obtained by emulsion polymerization often have better solubility characteristics than those obtained as otherwise indicated herein.

Interpolymers may be made by mixing the monomeric amino ester with any other polymerizable compound and subjecting the mixture to conditions under which both compounds polymerize. These interpolymers may be produced from any one or more of the amino esters of the present invention and any one or more of the following: vinyl esters, such as vinyl acetate, chloride, chloroacetate, and propionate; $\alpha$-methylene carboxylic acids and their derivatives, such as methacrylic acid, acrylic acid, itaconic acid, methyl methacrylate, dodecyl acrylate, methacrylic nitrile, and methacrylamide; conjugated dienes such as 1,3-butadiene, 2-methyl-1,3-butadiene, and 2-chloro-1,3-butadiene; polymerizable hydrocarbons, such as styrene and indene; and other vinyl compounds such as vinyl ethers and vinyl ketones. The amino esters of the present invention may also be polymerized in the presence of fatty oils, such as linseed oil, China-wood oil, coconut oil, cottonseed oil, and castor oil, as well as in the presence of natural or synthetic resins, such as rosin, dammar, phenol- and urea-formaldehyde resins, and alkyd resins. Of particular value are interpolymers of the present amino esters with different esters of $\alpha$-methylene carboxylic acids. These interpolymers may be made, not only by a simple polymerization of the mixed monomers, but also by heating the amino alcohol with the polymeric ester of the $\alpha$-methylene carboxylic acid in the presence of an ester interchange catalyst. Polymeric methyl acrylate and methyl $\alpha$-methacrylate are particularly well adapted for this purpose. The copolymer of isobutyl $\alpha$-methacrylate and 4-($\beta$-methacrylyloxyethyl)morpholine is of special interest as a coating composition base inasmuch as metal surfaces coated therewith are highly resistant to corrosion. Examples 9 to 12 below illustrate the preparation of specific copolymers. Others may be made similarly.

*Example 9.— Methyl methacrylate/$\beta$-diethylaminoethyl methacrylate interpolymer by emulsion polymerization*

A mixture of 52 parts (0.28 mol) of $\beta$-diethylaminoethyl $\alpha$-methacrylate and 28 parts (0.28 mol) of methyl $\alpha$-methacrylate is added to 720 parts of water containing 4 parts of sodium n-dodecyl sulfate and the mixture emulsified by passing it repeatedly through a colloid mill. To the emulsion thus obtained is added benzoyl peroxide (1% based on the combined weights of monomers used) and the mixture heated at 80° C. until polymerization is complete, or for about 20 hours. The polymer is recovered from the emulsion by coagulation with sodium chloride solution. It contains 0.67% nitrogen, and is soluble in benzene and dioxan. It may be used as a constituent of coating and molding compositions.

*Example 10.—Methyl methacrylate/$\beta$-dimethylaminoethyl methacrylate interpolymer by solution polymerization*

A solution of 31.4 parts (0.2 mol) of $\beta$-dimethylaminoethyl $\alpha$-methacrylate and 20 parts (0.2 mol) of methyl $\alpha$-methacrylate in 377 parts of dioxan is heated with 0.26 part of benzoyl peroxide at 100° C. for 4 days. The solvent is then removed by vacuum distillation, leaving behind a gummy resinous mass containing 5.18% nitrogen.

*Example 11.— Methyl methacrylate/$\beta$-diethylaminoethyl methacrylate interpolymer by ester interchange*

A 20% solution in benzene of one mol of methyl $\alpha$-methacrylate is refluxed on a steam bath for 2½ days in the presence of 0.5% benzoyl peroxide based on the weight of methyl methacrylate. The resulting solution of methyl methacrylate polymer is then diluted with 160 parts of benzene, and 117 parts (1 mol) of $\beta$-diethylaminoethanol is added. The solution thus obtained is refluxed under a 48 inch fractionating column for 20 hours, during which time a solution of 6 parts of sodium in 60 parts of methanol is added and a binary of methanol and benzene boiling at about 58° C. is continuously drawn off at the top of the column. The resulting solution of interpolymer in benzene is poured into benzine (B. P. 62–125° C.) to precipitate the interpolymer. After drying in vacuo, 115 parts of resin containing 3.4% nitrogen and soluble in acetone, dioxan, ethyl ether, and benzyl alcohol is obtained.

In preparing the monomeric esters of the present invention, the temperature and time of reaction may be varied over wide limits; however, it is generally desirable to employ as low a temperature as practical in order to avoid decomposition and polymerization of reactants or products. The particular time and temperature of reaction will vary both with the method of preparation and the nature of the reactants. In the majority of cases it is advisable to use a polymerization inhibitor for reactants and product. Suitable inhibitors are hydroquinone, p-phenylenediamine, pyrogallol, tannic acid, sulfur, selenium, cuprous chloride, and benzidine.

The amino alcohols used in the practice of this invention are amino alcohols in which the amino nitrogen is tertiary. Amino alcohols having primary and secondary amino nitrogen, except perhaps in isolated special instances, are not suitable because of amide formation and other probable reactions. There may be one or more than one amino groups, and one or more than one alcohol groups; however, the most readily available and most generally satisfactory amino alcohols are the monoamino monohydric alcohols. The alcohol group may be primary, secondary, or tertiary though the preference is in the order named. Two of the valences of the amino nitrogen may be satisfied by a closed chain of atoms (the annular atoms being all carbon or comprising other heteroatoms) and the third valence by some monovalent radical, or all three valences may be satisfied by monovalent radicals. The radicals attached to the nitrogen may be of many types—alkyl, aralkyl, alkoxyalkyl, aryl, or cycloalkyl groups, though at least one, of course, should contain an alcohol radical. The amino alcohol as a whole may thus be aliphatic, aromatic, alicyclic or heterocyclic; saturated or unsaturated; and mono or polyfunctional with respect to either amino or alcohol group, or both. So far as is known, the amino alcohol may be of any nature whatever so long as it contains an alcohol group and has tertiary amino nitrogen only. Specific amino alcohols suitable for use include the following: β-diphenylaminoethanol, β-diisopropylaminoethanol, β-di-n-propylaminoethanol, β-didodecylaminoethanol, γ-diethylaminopropanol, δ-diethylaminobutanol, δ-dibutylaminobutanol, δ-diisobutylaminobutanol, β-diisobutylaminoethanol, 2-(diphenylamino)cyclohexanol, 2-(di-o-tolylamino)cyclohexanol, β-(N-methyl-N-cyclohexylamino)ethanol, triethanolamine, tributanolamine, tripropanolamine, dimethylglucamine, 1-(β-hydroxyethyl)decahydroquinoline, the N-vinyl-N-alkylaminoethanols, 4-(β-hydroxyethyl)morpholine, 4-(β-hydroxyethyl)thiomorpholine, the dimethyl ether of triethanolamine, β-hydroxy-β-dimethylaminodiethyl ether, triethanolamine diacetate, 1-(β-hydroxyethyl)piperazine, 2-hydroxy-4-methylmorpholine, and di-(dimethylaminomethyl) carbinol.

Any α-substituted acrylic acid may be used in the practice of this invention. Suitable acids include α-phenylacrylic, α-butylacrylic, α-amylacrylic, α-isopropylacrylic, α-ethylacrylic, α-hexylacrylic, α-(o-tolyl)acrylic, α-hexahydrotolylacrylic, and α-cyclohexylacrylic acids. The α-alkacrylic acids are especially suitable, and the particular acid of greatest availability and utility is α-methacrylic. All these acids may be used as such or in the form of a derivative of the type hereinbefore specified which is capable of supplying the α-alkacrylyl radical.

When a polyhydric amino alcohol is used in the present process, it is possible by proper modifications to prepare esters in which more than one hydroxyl group is esterified. For example, the process of Example 6 may be modified by doubling or tripling the quantities of sodium and α-methacrylyl chloride, and triethanolaminedimethacrylate or -trimethacrylate, as the case may be, is then obtained.

In place of the sodium methylate of the examples, I may use any alkali metal oxide, hydroxide, or alcoholate. Suitable specific catalysts or adjuvants include sodium and potassium ethylates, butylates, glycolates, glycerates, oxides, and hydroxides.

The monomeric esters of the present invention find their chief use in the manufacture of those polymeric amino alkacrylates described herein, and of those polymeric amino alkacrylates that are obtained according to the method of Harmon, Serial No. 21,810, filed May 10, 1935, which method consists in first preparing an acid addition salt of the amino ester, polymerizing said salt, and converting the polymeric salt to the free base polymer. The monomers may also be used, when properly stabilized, as solvents and plasticizers, for which purposes the combination of the unsaturated linkage and the tertiary amino nitrogen makes them especially suited.

The polymeric amino α-alkacrylates find use as coatings, plastics, and adhesives. They may also be employed as rubber accelerators and as acid acceptors, e. g., in coating compositions based on halogen-containing resins.

The interpolymers described herein may be employed in the compounding of compositions intended for use as coatings, plastics, and adhesives.

These interpolymers also may be employed as dispersing agents for pigments, oils, waxes and the like, and such dispersions are very useful for fixing these substances to fabrics, leather, and paper. The interpolymers are also valuable as ingredients of water paints, alone or in combination with pigments, oils, or waxes.

Valuable polymeric quaternary salts may be prepared by reacting the monomeric or polymeric esters of this invention with alkyl, aryl, aralkyl, or alicyclic halides. These quaternary salts are very useful as dispersing agents for 2-chloro-1,3-butadiene, as emulsifying agents for pigments, oils and waxes, as adhesives, especially for joining wood to wood, and as fixatives for pigments, oils and waxes to fabrics, leather and paper.

From a consideration of the above specification it will be appreciated that many changes may be made in the processes described without departing from the invention or sacrificing any of its important advantages.

I claim:

1. A process for the preparation of an amino alcohol ester of an α-alkacrylic acid which comprises reacting a lower aliphatic alcohol ester of an α-alkacrylic acid with an amino alcohol in which the amino nitrogen is tertiary.

2. A process for the preparation of an amino alcohol ester of α-methacrylic acid which comprises reacting a lower aliphatic alcohol ester of α-methacrylic acid with an amino alcohol in which the amino nitrogen is tertiary.

3. A process for the preparation of β-diethylaminoethyl methacrylate which comprises reacting β-diethylaminoethanol with methyl α-methacrylate in benzene solution while in the presence of a polymerization inhibitor.

4. An α-alkacrylic acid ester of an amino alcohol in which the amino nitrogen is tertiary.

5. An α-methacrylic acid ester of an amino alcohol in which the amino nitrogen is tertiary.

6. An α-methacrylic acid ester of a monoamino monohydric primary alcohol in which the amino nitrogen is tertiary.

7. An α-methacrylic acid ester of a dialkylamino monohydric primary alcohol.

8. β-Diethylaminoethyl methacrylate.

9. β-Dimethylaminoethyl methacrylate.

10. A polymeric α-alkacrylic acid ester of an amino alcohol in which the amino nitrogen is tertiary.

11. A polymeric α-methacrylic acid ester of an amino alcohol in which the amino nitrogen is tertiary.

12. A polymeric α-methacrylic acid ester of a monoamino monohydric primary alcohol in which the amino nitrogen is tertiary.

13. A polymeric α-methacrylic acid ester of a dialklyamino monohydric primary alcohol.

14. Polymeric β-diethylaminoethyl methacrylate.

15. Polymeric β-dimethylaminoethyl methacrylate.

16. A copolymer of an α-alkacrylic acid ester of an amino alcohol in which the amino nitrogen is tertiary, and another polymerizable compound containing a $CH_2:C<$ group.

17. A copolymer of different esters of an α-alkacrylic acid, at least one of which is an ester of an amino alcohol in which the amino nitrogen is tertiary.

GEORGE D. GRAVES.